Dec. 31, 1963   E. A. MATECKI   3,115,669
APPARATUS FOR SHIRRING CASINGS
Original Filed Nov. 17, 1958   3 Sheets-Sheet 1

INVENTOR.
EDWARD MATECKI
BY Richard S. Shreve Jr.
ATTORNEY

Dec. 31, 1963   E. A. MATECKI   3,115,669
APPARATUS FOR SHIRRING CASINGS
Original Filed Nov. 17, 1958   3 Sheets-Sheet 2

INVENTOR.
EDWARD MATECKI
BY
ATTORNEY

Dec. 31, 1963 E. A. MATECKI 3,115,669
APPARATUS FOR SHIRRING CASINGS
Original Filed Nov. 17, 1958 3 Sheets-Sheet 3
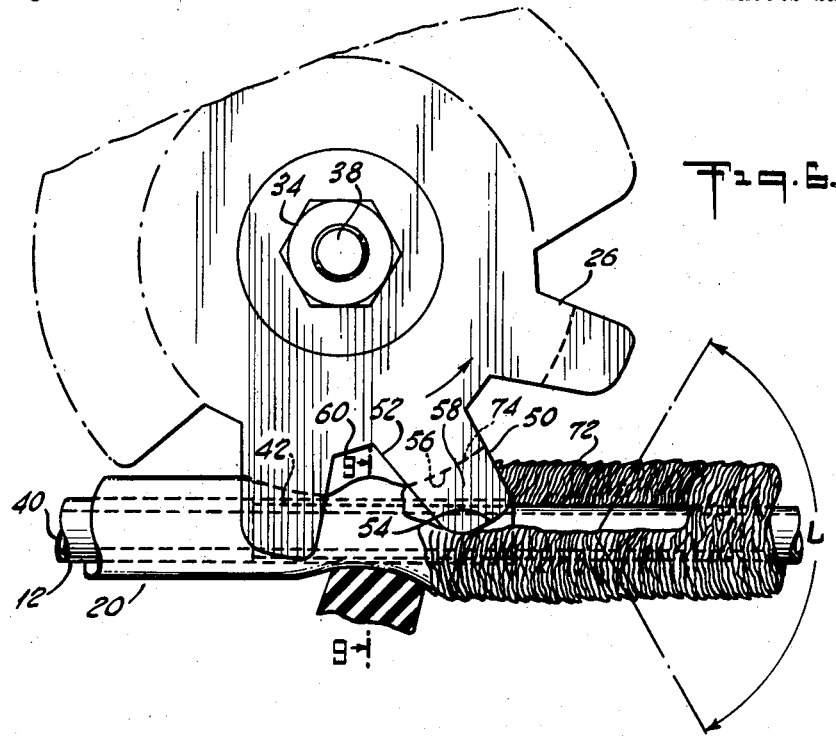
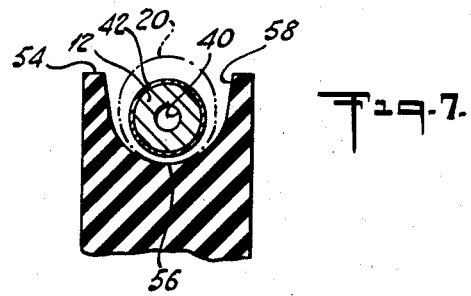
INVENTOR.
EDWARD MATECKI
BY
ATTORNEY

United States Patent Office 3,115,669
Patented Dec. 31, 1963

3,115,669
APPARATUS FOR SHIRRING CASINGS
Edward A. Matecki, Evergreen Park, Ill., assignor to Union Carbide Corporation, a corporation of New York
Original application Nov. 17, 1958, Ser. No. 774,444. Divided and this application Aug. 21, 1961, Ser. No. 136,383
4 Claims. (Cl. 17—42)

This application is a division of my copending application Serial No. 774,444, filed November 17, 1958.

This invention relates to an improved method of and apparatus for shirring tubing used as sausage casings. More particularly, this invention relates to a method and apparatus for shirring regenerated cellulosic tubing having a high moisture content.

This present invention permits shirring such casing with a moisture content of 12% or more and, consequently, eliminates the costly process of humidifying casings after shirring. The use of casing at the desired terminal stuffing moisture condition produces a more uniform stick in which the folds have been forced into close mutually supporting relation and which is more coherent in handling, thereby improving the efficiency of the meat stuffing operation. This gives a more uniform and precisely sized sausage product. Such uniformity and precision of sausage product are commercially important to the sausage manufacturer in unit packaging of a plurality of sausages to a specific net weight, such as one-, two-, or three-pound packages of frankfurters. The new method likewise permits using an economical shipping package by eliminating the necessity for the special and costly construction features of the package, disclosed in United States Patent No. 2,181,329—Hewitt.

An object of this invention is to provide a method of and apparatus for shirring and compressing cellulosic sausage casings having a moisture content of 12% or more.

Another object of this invention permits the shirring and compressing of cellulosic casing with a moisture content of 12% or more, thereby eliminating the need for humidification of the shirred stick of casing after shirring and compressing unit lengths of casing.

Another object of this invention permits the shirring, compressing, and packaging of casing with a moisture content of 12% or more, eliminating the necessity for humidification after shirring and permitting the use of a more economical shipping package containing a plurality of shirred casings.

Another object of this invention permits the shirring, compressing, and packaging of casing with a moisture content of 12% or more, and which results in a shirred stick of casing with moisture content considerably more uniform than casing shirred by previous methods.

Another object of this invention provides a new and improved shirred casing having a uniform moisture content specific for efficient and uniform stuffing of meat emulsions.

Another object of this invention provides for a sausage casing with a uniformly high moisture content shirred and compressed into a coherent, durable unit item.

Cellulose casing with a moisture content optimum for fast, uniform commercial stuffing procedures could not heretofore be shirred properly without damage. This invention permits shirring high moisture casing such as from about 12% to about 20% moisture, with an interfolded pleat pattern which, upon compression, yields a self-sustaining product wherein the folds have been forced into close mutually supporting relation, enabling uniformly smooth deshirring action in the stuffing operation.

The shirring of cellulose tubing is accomplished by longitudinally collapsing by pleating the tubing in continuous manipulation of a plurality of successive mechanical pressure surfaces, alternately coacting along opposing or adjacent sides of the gaseous inflated cellulose tubing and guided during such manipulation onto and by a tubular mandrel of a diameter approximately 75% of casing diameter, which moving pressure surfaces alternately and successively indent the inflated casing from true axial alignment with said mandrel, collapsing the protuberance opposite the indentation immediately preceding, folding the collapsed portions of the casing into a loosely interfolded, patterned configuration of pleats and compressing such interfolded pleats into a straight, coherent, firm, and durable unit item.

The compressing may be accomplished by subjecting the loosely shirred casing section to an axial compressing operation which forces the folds into close mutually supporting relation, thus forming a self-sustaining product as disclosed in U.S. Patent No. 2,001,461 granted to Alfred G. Hewitt, May 14, 1935.

Cellulose tubing of high moisture content, that is, about 12% or higher, is softer, more pliant, and flexible than casing of lower moisture content. While it would therefore be expected that such high moisture content casing could be shirred more easily, prior attempts were unsuccessful because of the casing clinging to the mandrel surfaces. It has now been found that a balance of moving forces is necessary to longitudinally collapse the tubing into a desirable pleat pattern. Such forces, interior by gaseous pressure and mandrel surface friction and exterior by coacting mechanical pressure surfaces, must be balanced to obtain an optimum interfolded, mutually supporting pleat formation and prevent undesirable cling of the casing to the mandrel.

The objects of the invention are accomplished in general by providing an arrangement of apparatus which continuously shirrs cellulose casing of a moisture content greater than approximately 12%, such as from about 12% to 20% moisture, without clinging to or gripping the mandrel, and which forms a compressed unit length of casing with a coherent pleat formation yielding a straight, firm stick of casing, and in a subsequent filling operation is capable of being deshirred in a regular, uniform manner and filled to a uniform diameter with a minimum of casing breakage.

The objects of the invention are accomplished in particular by providing the surface of the shirring mandrel in and adjacent to the zone of casing pleat formation, with a surface of low coefficient of friction such as about 0.20 (the coefficient of friction being measured as the tangent of the angle of slope on which the material will overcome its tendency to repose on the casing), and by proportioning the shape as hereafter described of the arcuately acting saddles comprising the mechanical pressure surfaces coacting with the inflated casing and by lubricating the interior of the tubing and the surfaces of the saddles with suitable oil, for example, but not by way of limitation, U.S. Pharmacopoeia white mineral oil of Saybolt color 30+ (water white) and Saybolt viscosity of 76° to 80° in a minimal amount to keep the saddles coated, such as .0002 gram to .0013 gram per 6" frankfurter length of casing shirred. The combination of a mandrel having a low coefficient of friction of the surface in the zone of shirring and the unique shape of the shirring saddles and the lubrication of the surfaces thereof combine to indent, pleat, and interfold the inflated tubing into an optimum configuration, such as a section of a prolate ellipsoid or deformed conical shape which, upon compression, forces the pleats of casing into a mutually supporting relation, whereby a uniform, straight, firm stick of casing conditioned for commercially acceptable stuffing performance is produced.

Oil applied to the shirring saddle surfaces in amounts substantially less than .0002 gram per 6″ frankfurter length of casing results in excessive casing breakage or results in a jamming of the casing pleat between the mandrel and shirring surface, causing the casing to adversely seize the mandrel and thus interfering with normal pleat formation.

Oil applied to the shirring saddles in amounts substantially greater than .0013 gram per 6″ frankfurter length of casing results in the casing being ineffectually gripped by the cogs of the shirring surfaces. Pleats which are thus formed are found to have a very acute, approximately conical pattern which seize the mandrel, thus interfering with normal pleat formation.

The amount of oil applied to the shirring saddles per 6″ frankfurter length of casing is preferably in a range of .0002 to .0013 gram; however, slight departure from this range has been found to yield satisfactory shirring performance.

The preferred means by which these objects have been accomplished are illustrated in the accompanying drawing in which:

FIG. 6 is a side elevation, partly in section, of a portion of one shirring unit of this invention; and FIG. 7 is a section taken generally along line 7—7 of FIG. 6.

Figure 1:
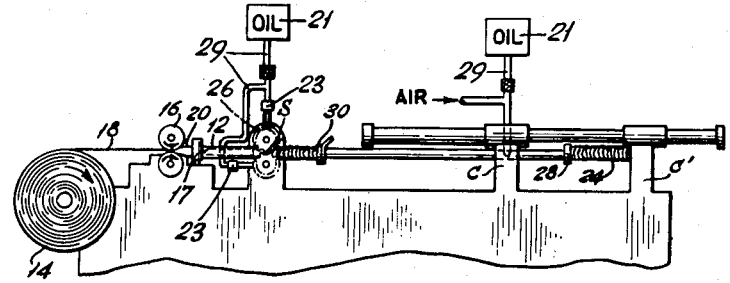
FIG. 1 is a side elevation (diagrammatic) of a shirring machine, a portion of which illustrates this invention.

In the automatic shirring machine shown, a supply of flattened tubing such as cellulose tubing 18 is intermittently withdrawn from a supply reel 14 in measured lengths, such as 40′, 44′, 55′, by a pair of metering rolls 16. The flattened tubing 18 is advanced through metering rolls 16, expanded to inflated tubing 20 as by gaseous means and guided onto and by a hollow mandrel 12 to a "zone of shirring" S by vertically mounted guide rolls 17. The mandrel supplies the gaseous means through an internal hole 40 shown in FIG. 2 and is releasably held in position by clamps C and C′.

The gaseous means which, for example, may be air under a pressure of about six pounds per square inch gauge is supplied from any convenient source to the bore of mandrel 12 through clamp C communicating with the bore of the mandrel 12 through a radial opening in the mandrel wall. Metered quantities of oil are supplied to the air stream from an oil reservoir 21 whereby the oil is carried by the air stream through the bore 40 and is discharged at the end of the mandrel 12 adjacent to guide rolls 17 to lubricate the exterior surface of the mandrel and the interior surface of the inflated casing 20.

Figure 2:
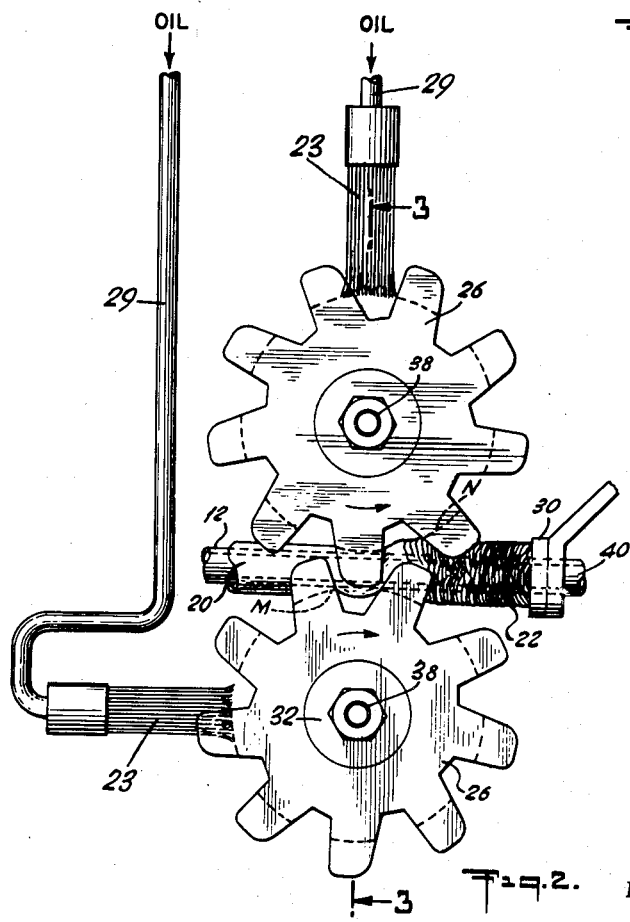
FIG. 2 is an enlarged side elevation of that part of the apparatus embodying this invention.

As shown in FIGS. 1 and 2, the basilar surfaces of cogged shirring units 26 are lubricated by brushes 23 to which a suitable lubricant is fed from an oil supply reservoir 21 through connecting piping 29.

The inflated casing is loosely shirred by shirring means 26 against a cooperatively yielding holdback surface 30 and the shirred casing 22 is then cut off from a subsequent length of shirred casing at a point adjacent to the discharge side of shirring zone S, the cut length is moved through opened clamp C and compressed in lengths to such as 7″ to 12″ by compressing surface 28, resulting in a compressed, shirred casing 24. The shirred compressed stick of casing 24 is doffed from the mandrel through the advanced clamp C′ for packaging.

Referring now to FIG. 2, the shirring means in the preferred embodiment is comprised of two cylindrical cogged shirring units 26 vertically disposed with alternately opposed shirring saddles and rotatably driven in opposite directions by horizontal shafts 38 arranged on machine 10 on a center line 3—3 common to and at right angles to the horizontal centerline A—A (on FIG. 4) of mandrel 12. Rotating in the direction of the arrows shown, the shirring units 26 engage the gaseous inflated casing 20 supplied continuously to the "zone of shirring" S by metering rolls 16 and by action of suitable surfaces on shirring units 26 later described, pleat, and loosely shirr the casing 22 against a movable surface 30 which straddles the major portion of mandrel 12.

Figure 3:
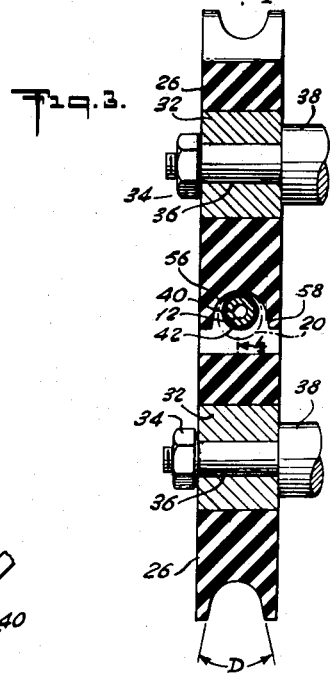
FIG. 3 is a section taken generally along line 3—3 of FIG. 2.

Referring to FIG. 3, the working surfaces of the cylindrical cogged shirring units 26 are made of a resilient material such as preferably an oil resistant synthetic rubber composition (such as Ideal Roller Company's compound XN 1428, and of 75°–85° Durometer hardness and with a surface finish of about 8 to 12 micro-inch (A.S.A. standard) mounted on metallic core 32, engaging step 36 on shaft 38 and affixed thereto by fastening 34. The working diameter of shirring units 26 is proportioned such that the shirring surface 56, when it is closest to the surface of mandrel 12 is preferably spaced $\frac{1}{64}$″ from such mandrel surface.

Figure 4:
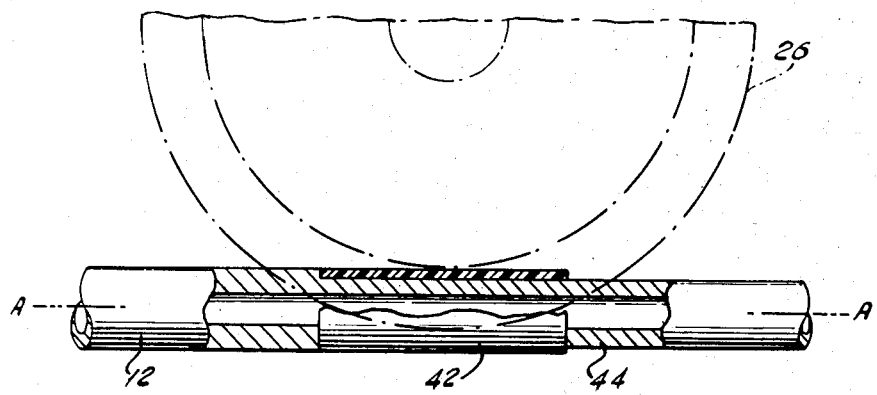
FIG. 4 is a further enlarged side elevation, partly in section, showing a portion of the shirring mandrel and taken generally along line 4—4 of FIG. 3.

Referring now to FIG. 4, that portion of the mandrel 12 in the "zone of shirring" S is provided with a surface 42 preferably of nylon (a polyamide) or similar material such as Teflon (polymerized tetrafluoroethylene) found to have a coefficient of friction such as about 0.20, such that high moisture casing will readily slide on such surface. At a position on the mandrel 12 coincident with disengagement N shown in FIG. 2 of the shirring unit 26 from the shirred casing 22, portion 44 of mandrel 12 is reduced in diameter.

Figure 5:
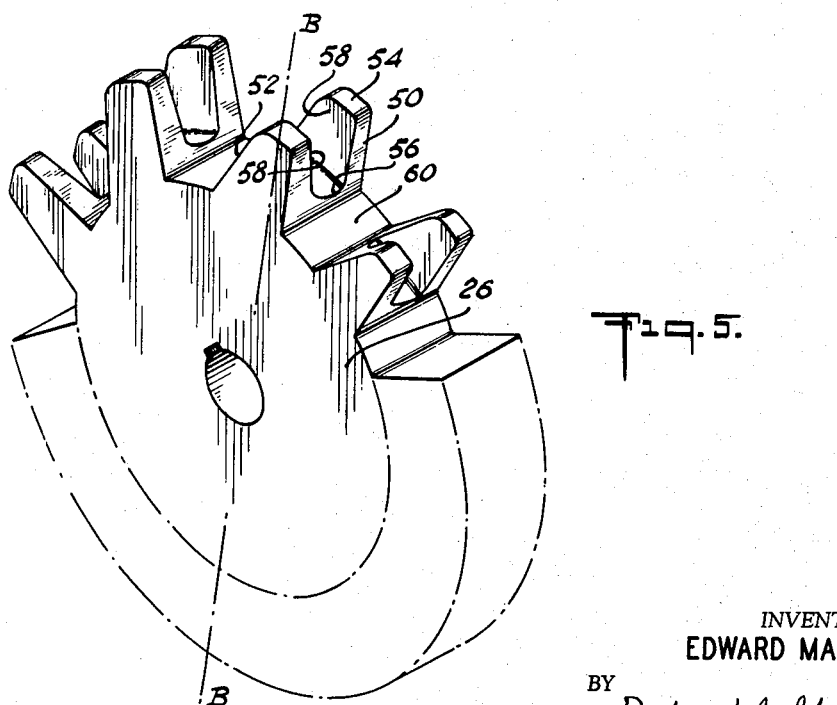
FIG. 5 is an enlarged perspective of a portion of shirring unit 26.

Referring now to FIG. 5, the cylindrical cogged shirring unit 26 is provided with a plurality of cogged shirring surfaces, each saddle shaped and proportioned to engage the inflated casing 22 in a portion of a circular path. The arcuate basilar surface 56 of each saddle unit is shaped as by rotating a circular arc of a diameter preferably proportioned to the diameter of casing being shirred, such as $\frac{1}{32}$″ smaller than the casing around the center of shaft 38, the basilar surface being tangentially joined to lateral surfaces 58 divergent from surface 56 at an included angle centrally disposed on vertical axis 4—4 shown in FIG. 3, such as preferably 15°. The root diameter of surfaces 56 of the saddles is preferably formed at a radius less than the distance between the centerline of shaft 38 and the closest surface of mandrel 12, such as $\frac{1}{32}$″ less, and greater than the adjacent saddle root diameter 60, such as $\frac{1}{2}$″ greater. The leading edge surface 50 of each saddle is preferably approximately parallel to the radial center-line B—B of rim surface 54. The trailing edge 52 of the saddle is sloped rearwardly from the radial centerline B—B of the saddle rim 54. However, the slope of the trailing edge is not critical for the shirring action obtained.

The number and dimensions of saddle-shaped cogs and the pitch spacing thereof of shirring surface 26 must be varied for the optimum shirring of various sizes of casing. It is obvious that optimum pleat formation to yield a compressed stick of proper length and hole size requires a proportionate change in dimensions of cogs and mandrels for various casing diameters. In general, the larger the casing diameter, the larger the mandrel diameter and pitch spacing of cogs. For example, casing of $\frac{23}{32}$″ diameter may be shirred on a mandrel $\frac{33}{64}$″ diameter using a shirring surface with ten cogs. A 55′ length may thus be shirred and compressed to 9″, with a hole size in excess of $\frac{7}{16}$″. A shirring surface with nine cogs is used for shirring casing of $\frac{27}{32}$″ diameter and a shirring surface of 11 cogs is used for shirring casing of $\frac{21}{32}$″ diameter. The pitch spacing of cogs may range from one to two inches. The root diameter of shirring unit 26 is preferably approximately 4 inches. However, other root diameters may be employed such as from 3" to 8" diameter with appropriate change to the slope of surface 50.

Referring again to FIGS. 2 and 3, the rotating saddle of the cogged shirring unit 26 initially engages basilar surface 56 with a portion of the surface of inflated casing 20 at M and in advancing movement additionally engages the lateral surfaces 58 of the saddle with the casing, which by displacing the inflated casing from its normal path centered on mandrel 12, thereby effectively grips the casing and moves the casing intermediate the leading edge 50 of the engaging surface, and the trailing edge 52 of the preceding shirring surface to disengaging position N against the previously shirred mass of casing 22, thereby collapsing and pleating that portion of inflated casing to produce a loosely shirred casing of interfolded pleats.

In using casing with a moisture content ideal for optimum stuffing with meat emulsion, such as approximately 14% (ranging from 12% to 20% moisture content), shirring is accomplished on the apparatus of the invention with no difficulty. When using such casing, shirring saddles of the alternately opposed cooperating shirring units 26 disengage from the shirred casing as at N, and the pleated casing remains in such position on the mandrel 12 momentarily, until it is advanced by succeeding shirring action. However, when using low moisture casing, such as approximately 9%, the shirred casing at disengagement position N of saddles 56 tends to expand rearwardly and thereby retreats to the succeeding advancing leading surface 50. The two types of casing, high moisture as characterized by a moisture content greater than about 12% and low moisture as characterized by a moisture content less than about 12%, require different combinations of shirring surfaces and mandrel surface to obtain a commercially desirable shirred stick of casing and this invention is based thereon.

Commercially acceptable shirred casing is preferably shirred with a type of pleat pattern which after compression to packaging length is not so coherent that it will adversely affect the smooth, free deshirring action desirable in an efficient stuffing operation. However, such a stick of casing should preferably be shirred with a pleat pattern which, upon compression, shall force the folds into close mutually supporting relation, thus forming a self-sustaining product which will not prematurely deshirr in handling.

Referring now to FIG. 6, high moisture casing shirred on the apparatus of this invention is readily shirred into a configuration of pleats, such as a section of a prolate ellipsoid or deformed conical shape 72 and of an included angle L such as approximately 120°, the pleats being interfolded sufficiently that, upon compression, the stick of casing will cohere as a unit item, but not so interfolded as to adversely affect the stuffing operation. Forming the shirring saddle with sloping lateral sides 58 at a centrally disposed included angle D, such as 15°, as shown in FIG. 3 and providing the surface 42 of the mandrel in the zone of shirring S with a material of low coefficient of friction as shown in FIG. 4, has been found to result in a shirred pleat pattern optimum for the commercial requirements heretofore described.

An actual form of apparatus according to the invention and as illustrated in FIGS. 1 to 5, 6 and 7 was constructed and operated to shirr lubricated cellulosic casing of 26/32" inflated diameter at the rate of 420 feet per minute of casing stock, said casing being inflated with air at a pressure of six to seven pounds per square inch gauge. The casing and mandrel 12 were lubricated with U.S. Pharmacopoeia white mineral oil (Saybolt viscosity of 76° to 80°) in an amount of about 0.0005 gram thereof per 6-inch length (frankfurter length) of casing being shirred.

In repeated operations, 55 foot lengths of said casing stock of about 16 percent moisture content were shirred on a mandrel of 0.60 inch diameter which was slightly reduced in diameter (0.57 inch) following the shirring zone to facilitate movement of the shirred casing therealong to a compressed length of about nine inches, the movement of the shirred casing along the mandrel being retarded by a holdback mechanism 30 to a rate of one inch for each two feet of unshirred casing.

The specifications of each of the two rolls 26 were as follows:

| | |
|---|---|
| Roll thickness | 1.25 inches. |
| Rim 54 diameter | 5.25 inches. |
| Saddle shaped cogs per roll | 9. |
| Radius of arcuate basilar surface 56 | 0.38 inch. |
| Root diameter of surfaces 56 | 4⅛ inches. |
| Root diameter included angle of lateral surfaces 58 | 15°. |
| Rearward slope of trailing edge 52 | 12°. |
| Leading edge surface 50 | Parallel to radial centerline saddle rim 54. |
| Arcuate base width of cog (along diameter 60) | ¾ inch. |
| Pitch spacing of cogs | 1½ inches. |
| Saddle root diameter 60 | 3½ inches. |

Each of rolls 26 were synchronously driven with a clearance of about ⅛ inch between the trailing edge 52 of each cog of one roll 26 with the leading edge 50 of each cog of the other roll 26 meshing therewith.

The method of the invention as described permits the shirring and packaging of cellulose tubing without rehumidifying or additional processing required prior to stuffing with meat emulsion.

The article produced by the method and apparatus described is a more coherent and durable unit item which may be more economically packaged than heretofore and which permits more commercially satisfactory operation by frankfurter manufacturers.

The article produced as described is more uniform in moisture content and shirred in a coherent manner better suited for commercially acceptable stuffing procedures.

As indicated by statements occurring above, the improved process and product result in very considerable economics in the manufacture and shipment of cellulose sausage casings and in the employment thereof in packing houses.

The phrase high moisture casing should not be construed to limit the type of tubing and moisture content described.

It is to be understood that the softener and moisture content of the cellulose tubing, as well as chemical modification of the cellulose can be varied to obtain the same degree of softness and flexibility as that possessed by the high moisture casing and it is these characteristics of the casing which necessitate the new and unique method and apparatus.

What is claimed is:

1. Apparatus for shirring cellulose tubing which comprises a tubular mandrel of the order of 75% of the casing diameter, means for guiding the tubing onto said mandrel to a zone of casing pleat formation, means for passing gas through said mandrel to inflate the tubing thereon, a plurality of successive arcuately acting shirring saddles mounted for movement into successive engagement with said tubing in said zone, said saddles having arcuate basilar surfaces and lateral surfaces tangent thereto and diverging radially away from the center of arcuate action, and means for driving said saddles for such arcuate movement for longitudinally collapsing by pleating the tubing by continuous manipulation of said surfaces alternately coacting along opposing and adjacent sides of the gaseous inflated tubing.

2. Apparatus as claimed in claim 1 in which the lateral divergent surfaces extend beyond the centerline of the mandrel, and the mandrel and the unique shape of the shirring saddles are combined to indent, pleat, and interfold the inflated tubing in a manner to provide substantially conical configuration to the interfolded pleats of casing, whereby the frictional effects of the casing on the mandrel are minimized to produce a uniformly straight, firm stick of casing conditioned for economical stuffing performance.

3. Apparatus for shirring cellulose tubing which comprises a tubular mandrel, means for guiding said tubing onto said mandrel, means for passing gas through said mandrel to inflate the tubing thereon, a plurality of arcuately acting shirring saddles mounted for movement into successive engagement with said tubing on said mandrel, said saddles having arcuate basilar surfaces and lateral surfaces tangent thereto with an included angle of the order of 15°, and means for driving said saddles for such movement.

4. Apparatus for shirring cellulose tubing having a moisture content greater than 12%, which comprises a hollow mandrel having a shirring zone and lower coefficient of friction in the shirring zone than the remainder of the mandrel surface, means for advancing the tubing into said hollow mandrel means for supplying gaseous medium through said hollow mandrel to inflate said tubing, shirring saddles having continuously alternately coacting successive shirring surfaces along opposite sides of the inflated tubing inwardly toward said mandrel, means for driving said saddles to indent the inflated tubing transversely and form transverse protuberances between the indentation, said shirring surfaces having trailing edges sloping rearwardly, and means for longitudinally collapsing the protuberances and indentations and folding the same into a uniform loosely interfolded, substantially conical, patterned configuration of pleats, and compressing such interfolded pleats into a straight, firm, and durable unit, in which the saddles having alternately coacting successive shirring surfaces are mounted on the peripheries of a pair of rolls in intermeshing relation, with portions of each intermeshing part extending beyond the centerline of the tubing therebetween.

References Cited in the file of this patent
UNITED STATES PATENTS

| | | |
|---|---|---|
| 2,583,654 | Korsgaard | Jan. 29, 1952 |
| 2,722,714 | Blizzard et al. | Nov. 8, 1955 |
| 2,819,488 | Gimbel | Jan. 14, 1958 |